UNITED STATES PATENT OFFICE.

JAMES E. GILLESPIE, OF WARWICK, NEW YORK.

WATERPROOFING COMPOUND.

SPECIFICATION forming part of Letters Patent No. 255,615, dated March 28, 1882.

Application filed November 19, 1881. (No specimens.)

*To all whom it may concern:*

Be it known that I, JAMES E. GILLESPIE, of Warwick, in the county of Orange and State of New York, have invented a certain new and Improved Waterproofing Compound, of which the following is a specification.

My improved compound is more especially intended for the treatment of fabric fire-hose, but it is equally applicable for treating any woven fabric which it is desired to render water-proof or the yarn from which said fabrics are woven.

My invention consists in a waterproofing compound composed of vulcanized india-rubber and paraffine-wax with oil, which prevents the rubber and paraffine-wax from becoming hard and brittle when set.

In preparing my compound I take about equal parts by weight of vulcanized india-rubber and paraffine-wax and about double the quantity of oil and heat them to a higher temperature than that to which the rubber has been subjected in vulcanization—say from two hundred degrees (200°) to four hundred degrees (400°) Fahrenheit—and I maintain them at such a heat until the rubber is thoroughly dissolved.

The vulcanized rubber which I use may consist of old and worn-out vulcanized rubber articles of any kind, which are useless for the purposes for which they were originally intended, and therefore this ingredient of my compound will cost very little.

The oil which I prefer is either heavy petroleum or "black" oil, as it is commonly termed, from which the lighter oils have been removed by distillation, or a mixture of such black oil and linseed-oil. Where both kinds of oil are used they may be mixed in equal parts for use. The use of oil with the rubber and paraffine-wax is very desirable, as it prevents the latter from becoming hard and brittle when set and keeps the compound soft and pliable even after it is set. The linseed-oil makes the compound dry more quickly, but it may be dispensed with. I may for some purposes add naphtha or spirits of turpentine to the compound. The quantity of oil may be varied according to the degree to which it is desired to thin the compound, and although the relative proportions of the several ingredients above mentioned have been found desirable for some purposes, they may not be for other purposes, and may be varied, as is found to be desirable.

This compound may be applied hot, warm, or cold. It may be applied to the yarn before weaving or to the hose or other fabric after weaving, and it may be allowed to dry by exposure to the air or dried or struck in by heat in an oven.

This compound will be found very useful for preserving woven fabrics from moisture, and even if the articles to which it is applied are immediately immersed in water it will still be effective.

I am aware that a compound for waterproofing and insulating composed of rubber vulcanized or in its natural state and paraffine or bees wax, or both paraffine and bees wax, have been used, and I make no claim thereto; but such compound when set becomes hard and brittle, and is not therefore suitable for fabric hose or other fabrics, which should be soft and pliable.

What I claim as my invention, and desire to secure by Letters Patent, is—

A waterproofing compound composed of vulcanized india-rubber, paraffine-wax, and oil in about the proportions herein set forth.

JAMES E. GILLESPIE.

Witnesses:
JOHN J. BEATTIE,
SAMUEL GLIKE.